US011893925B2

(12) United States Patent
Holland et al.

(10) Patent No.: US 11,893,925 B2
(45) Date of Patent: Feb. 6, 2024

(54) ALWAYS-ON DISPLAY SIGNAL GENERATOR

(71) Applicant: Apple Inc., Cupertino, CA (US)

(72) Inventors: Peter F Holland, Los Gatos, CA (US); Christopher P Tann, San Jose, CA (US); Ramana V Rachakonda, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/736,715

(22) Filed: May 4, 2022

(65) Prior Publication Data

US 2023/0084199 A1 Mar. 16, 2023

Related U.S. Application Data

(60) Provisional application No. 63/244,838, filed on Sep. 16, 2021.

(51) Int. Cl.
*G09G 3/20* (2006.01)

(52) U.S. Cl.
CPC ....... *G09G 3/2092* (2013.01); *G09G 2310/08* (2013.01); *G09G 2330/023* (2013.01)

(58) Field of Classification Search
CPC ............. G09G 3/2092; G09G 2310/08; G09G 2330/023
See application file for complete search history.

(56) References Cited

U.S. PATENT DOCUMENTS 5,862,150 A * 1/1999 Lavelle .................. G09G 5/395 345/530
9,201,483 B2 * 12/2015 Lin ...................... G09G 3/3611
10,394,515 B2 8/2019 Park
10,643,565 B2 5/2020 Park et al.
10,803,785 B2 10/2020 Tong et al.
11,086,447 B2 8/2021 Bae et al.
2006/0017847 A1 * 1/2006 Tardif ...................... H04N 5/14 348/E5.062
2008/0012842 A1 * 1/2008 Mori .................... G09G 3/3677 345/206
2014/0198089 A1 * 7/2014 Lin ...................... G09G 3/3611 345/212
2014/0281626 A1 9/2014 Younger et al.

(Continued)

FOREIGN PATENT DOCUMENTS

WO 201710822 A1 1/2017

OTHER PUBLICATIONS

International Search Report & Written Opinion for PCT Application No. PCT/US2022/035351 dated Oct. 19, 2022; 12 pgs.

*Primary Examiner* — Gene W Lee
(74) *Attorney, Agent, or Firm* — Fletcher Yoder, P.C.

(57) ABSTRACT

An electronic device may include a display panel. When content of an image frame is expected to consume relatively higher amounts of power, a controller of the electronic device may operate a switch to change a power supply of the display panel to be a power management integrated circuit of the electronic device. However, when content of an image frame is expected to consume relatively less amounts of power, the controller may operate the switch to change the power supply of the display panel to be a power supply of an electronic display, such as a power supply used to power driver circuitry of the electronic display.

20 Claims, 9 Drawing Sheets

(56) References Cited

U.S. PATENT DOCUMENTS

| | | | | |
|---|---|---|---|---|
| 2015/0277545 | A1 | 10/2015 | Flowers et al. | |
| 2019/0189048 | A1 | 6/2019 | Hong et al. | |
| 2020/0111439 | A1* | 4/2020 | Kim | G09G 3/3614 |
| 2021/0065652 | A1 | 3/2021 | Han et al. | |

* cited by examiner

ALWAYS-ON DISPLAY SIGNAL GENERATOR

CROSS-REFERENCE TO RELATED APPLICATIONS

This application claims priority to and the benefit of U.S. Provisional Application No. 63/244,838, entitled "ALWAYS-ON DISPLAY SIGNAL GENERATOR," filed Sep. 16, 2021, which is herein incorporated in its entirety for all purposes.

BACKGROUND

The present disclosure relates generally to electronic displays and, more particularly, to signal generation to operate an electronic display in a low-power mode.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices often use one or more electronic displays to present visual representations of information as text, still images, and/or video by displaying one or more images (e.g., image frames). For example, such electronic devices may include computers, mobile phones, portable media devices, tablets, televisions, electronically-enabled watches, virtual-reality headsets, and vehicle dashboards, among many others. In any case, to display an image, an electronic display may control light emission (e.g., luminance) of its display pixels based at least in part on corresponding image data.

In some instances, the electronic device may enter a low-power mode, such as while presenting slow changing or static image content. To enter a low-power mode, electrical power to a system-on-a-chip (SOC) and/or select circuitries of the electronic device may be reduced or powered off. The electronic device may use the low-power mode when circuitries are idle between operations, such as between processing subsequent image frames.

SOC operations and electronic display operations may be synchronized to timing signals generated by a timing generator of the SOC while in a normal power consumption operational mode. However, the timing generator may be turned off when the SOC operates in the low-power mode. This could cause the timing of SOC operations and electronic display operations to misalign. For example, the electronic display may delay preparing for a next image frame until receiving the timing signals, and transmission of the timing signals may be delayed until the SOC is powered on again, which may delay image presentation. Correspondingly, this could lead to perceivable visual glitches, delays, or other visual errors in the presented image content.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

An electronic device may include components that consume electrical power. For example, electronic devices may include an image source that renders image frames by generating corresponding image data, which may be stored in memory. Some electronic devices may include a display pipeline. The display pipeline may process the image data before the image data is used to display the image frame on an electronic display to improve the perceived image quality of the image frame.

Based at least in part on received image data, the electronic display may control light emission or luminance of its light-emitting or light-permitting components to display an image frame corresponding to the image data. For example, in a liquid crystal display (LCD), electrical energy may be stored in the pixel electrode of a display pixel to produce an electric field between the pixel electrode and a common electrode, which controls orientation of liquid crystals and, thus, permits various amounts of light emission from the display pixel. In an organic light-emitting diode (OLED) display, electrical energy may be stored in a storage capacitor of a display pixel to control electrical power (e.g., current, voltage) supplied to a self-emissive component (e.g., OLED), and thus, light emission from the display pixel. However, electronic devices, such as wearable or portable electronic devices, often store a finite amount of electrical energy.

Accordingly, the present disclosure provides techniques for implementing an electronic display that may continuously present images even while some components of the electronic device are not operating or are powered off (e.g., partially or fully powered off). Indeed, the electronic device may include a processor that determines to power-off and/or power-gate (e.g., reduce power) image processing circuitry of the electronic display when idle. The electronic display may include a frame buffer. Image data to be presented may be stored in the frame buffer. When image data is unchanged, the values may remain unchanged in the frame buffer. However, removing the frame buffer may reduce a footprint of the electronic display, and thus improve the electronic device by enabling the circuitry to fit in a wider variety of size-based or weight-based engineering constraints.

One way to design around the frame buffer may include using image processing circuitry to change or refresh image content presented on the electronic display via image data transmission. Always-on displays (AOD) that continuously present some type of image content while powered on may support this frame buffer-less "video mode" at variable refresh rates by aligning operations to sub-frames of an image frame using timing signals. However, operating the electronic device in the low-power mode may power off a timing generator, which may stop timing signal generation until normal or full supply power is returned.

To continuously provide timing signals, an AOD timing generator may be included in an always-on (e.g., AON, AOD) power domain, which remains powered on while the electronic device is on or partially on. This may permit the AOD timing generator to generate timing signals used by the electronic display even while the electronic device is operated in the low-power mode, thereby improving operations of the electronic display.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
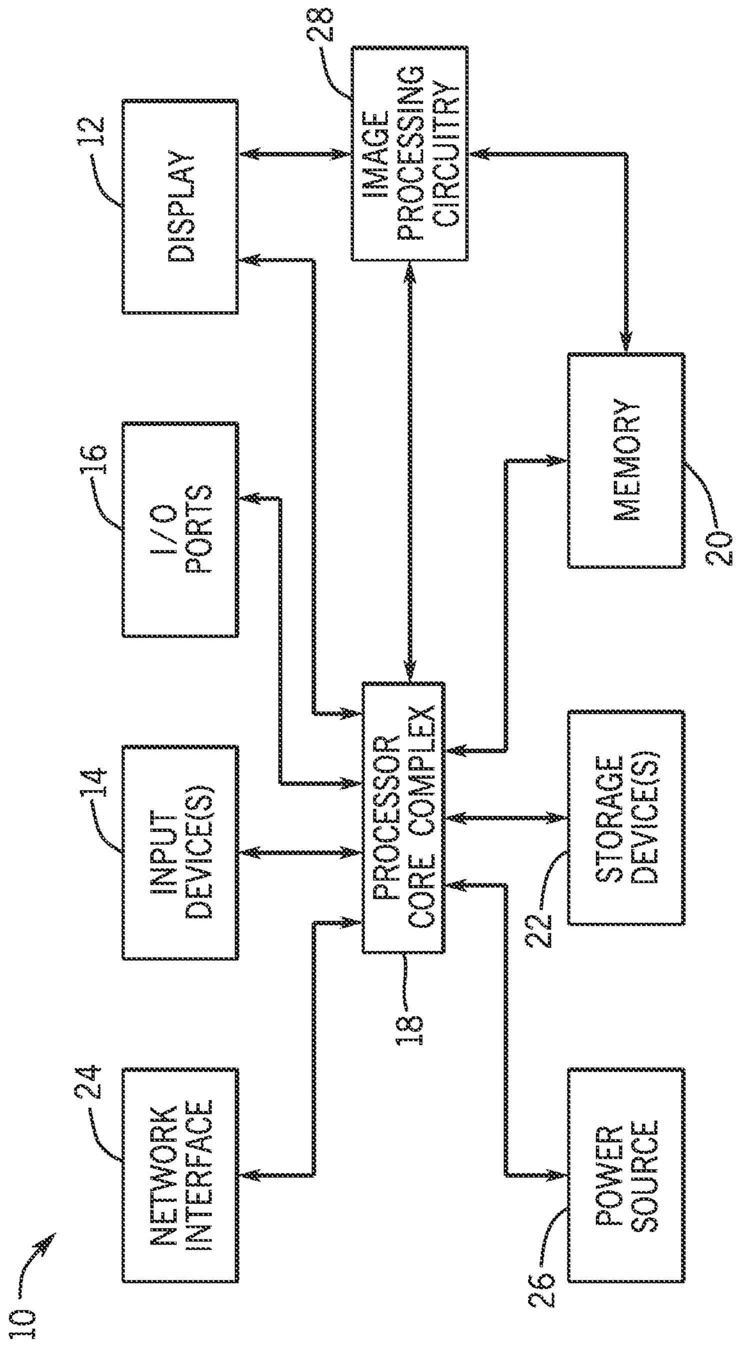
FIG. 1 is a block diagram of an electronic device with an electronic display, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

A frame buffer may be used in an electronic display to repeat or buffer image data before transmission to pixels. However, some electronic displays may use systems and methods that exclude a frame buffer. For example, image processing circuitry may transmit image data to the electronic display to trigger each refresh or image frame change rather than the electronic display repeating image data from a frame buffer. The image processing circuitry may manage generation of timing signals used to synchronize operations between the electronic display and the image processing circuitry. Omitting the frame buffer and including a timing generator in the image processing circuitry may reduce a footprint of the electronic display, improving electronic display technology.

The electronic display may be an always-on display (AOD) that presents some amount of image content while powered on even when the electronic device is in a low-power mode. To operate in the low-power mode, the electronic device may power off the timing generator, which may stop timing signal generation until exit from the low-power mode. Although image content may continue to be presented via the AOD, the image content may be misaligned, and thus may include visual artifacts, glitches, or the like, introduced from timing alignment errors.

To enable continuous timing signal generation, an AOD timing generator may be included in an AOD power domain. This may permit the AOD timing generator to generate the timing signals while the timing generator and additional circuitry are powered off. The AOD timing generator may generate a timing generation synchronizing (sync) signal, a line time sync signal, a vertical blanking (Vblank) sync signal, a touch scan control signal, and an extended blank period sync signal based on a video clock signal. The video clock signal may be generated from a crystal and an always-on (AON) phase locked loop (PLL). The AOD timing generator may transmit the timing generation sync signal to the timing generator at exit from the low-power mode once power is returned to the timing generator. The timing generator may align its generation operations to the timing generation sync signal. The AOD timing generator may transmit the line time sync signal, the Vblank sync signal, the touch scan control signal, and the extended blank period sync to the electronic display. The electronic display may reference the line time sync signal when setting image frame presentation durations and/or aligning to an emissivity loop that sets the image frame presentation duration. The electronic display may trigger touch scan operations (e.g., touch sensing operations) in response to receiving the touch scan control signal. Moreover, the electronic display may manage an arbitrary presentation time display mode based on the extended blank period sync signal, which may indicate when a presentation time duration of any length begins and ends.

To help illustrate, an electronic device 10 including an electronic display 12 is shown in FIG. 1. As is described in more detail below, the electronic device 10 may be any suitable electronic device, such as a computer, a mobile phone, a portable media device, a tablet, a television, a virtual-reality headset, a vehicle dashboard, and the like. Thus, it should be noted that FIG. 1 is merely one example of a particular implementation and is intended to illustrate the types of components that may be present in an electronic device 10.

The electronic display 12 may be any suitable electronic display. For example, the electronic display 12 may include a self-emissive pixel array having an array of one or more of self-emissive pixels. The electronic display 12 may include any suitable circuitry to drive the self-emissive pixels, such as display driver integrated circuits (DDICs) like row drivers and/or column drivers. Each of the self-emissive pixel 82 may include any suitable light emitting element, such as an LED, one example of which is an OLED. However, any other suitable type of pixel, including non-self-emissive pixels (e.g., liquid crystal as used in liquid crystal displays (LCDs), digital micromirror devices (DMD) used in DMD displays) may also be used.

The electronic device 10 may include the electronic display 12, one or more input devices 14, one or more input/output (I/O) ports 16, a processor core complex 18 having one or more processor(s) or processor cores, local memory 20, a main memory storage device 22, a network interface 24, a power source 26, and image processing circuitry 28. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the main memory storage device 22 may be included in a single component. It is noted that the image processing circuitry 28 (e.g., a graphics processing unit) may be included in the processor core complex 18.

The processor core complex 18 is operably coupled with local memory 20 and the main memory storage device 22. Thus, the processor core complex 18 may execute instruction stored in local memory 20 and/or the main memory storage device 22 to perform operations, such as generating and/or transmitting image data. As such, the processor core complex 18 may include one or more general purpose microprocessors, one or more application specific integrated circuits (ASICs), one or more field programmable logic gate arrays (FPGAs), or any combination thereof.

The local memory 20 and/or the main memory storage device 22 may store data to be processed by the processor core complex 18. Thus, the local memory 20 and/or the main memory storage device 22 may include one or more tangible, non-transitory, computer-readable mediums. For example, the local memory 20 may include random access memory (RAM) and the main memory storage device 22 may include read-only memory (ROM), rewritable non-volatile memory such as flash memory, hard drives, optical discs, and/or the like.

The processor core complex 18 is also operably coupled to the network interface 24. The network interface 24 may communicate data with another electronic device and/or a network. For example, the network interface 24 (e.g., a radio frequency system) may enable the electronic device 10 to communicatively couple to a personal area network (PAN), such as a Bluetooth network, a local area network (LAN), such as an 1622.11x Wi-Fi network, and/or a wide area network (WAN), such as a $4^{th}$ Generation (4G) or Long-Term Evolution (LTE) network (e.g., cellular network), or $5^{th}$ Generation (5G) or New Radio (NR) network.

The processor core complex 18 is also operably coupled to the power source 26. The power source 26 may provide electrical power to one or more components in the electronic device 10, such as the processor core complex 18 and/or the electronic display 12. Thus, the power source 26 may include any suitable source of energy, such as a rechargeable lithium polymer (Li-poly) battery and/or an alternating current (AC) power converter. The power source 26 may use distribution rails and/or additional smaller power sources within the electronic device 10 to aid in supplying power to the one or more components.

The processor core complex 18 is also operably coupled to the one or more I/O ports 16. The I/O ports 16 may enable the electronic device 10 to interface with other electronic devices. For example, when a portable storage device is connected, the I/O port 16 may enable the processor core complex 18 to communicate data with the portable storage device.

The electronic device 10 is also operably coupled to the one or more input devices 14. The input device 14 may enable user interaction with the electronic device 10 by receiving user inputs. Thus, an input device 14 may include a button, a keyboard, a mouse, a trackpad, and/or the like. The input device 14 may include touch-sensing components in the electronic display 12. The touch sensing components may receive user inputs by detecting occurrence and/or position of an object touching the surface of the electronic display 12.

In addition to enabling user inputs, the electronic display 12 may include a display panel with one or more display pixels. The electronic display 12 may control light emission from the display pixels to present visual representations of information based on image data corresponding to the visual representations of information. For example, the electronic display 12 may present graphics including a graphical user interface (GUI) of an operating system, an application interface, a still image, video content, or the like by displaying frames based at least in part on image data. The electronic display 12 is operably coupled to the processor core complex 18 and the image processing circuitry 28. The electronic display 12 may display frames based on image data generated by the processor core complex 18, the image processing circuitry 28, or the like. The electronic display 12 may display frames based at least in part on image data received via the network interface 24, an input device, and/or an I/O port 16.

Figure 2:
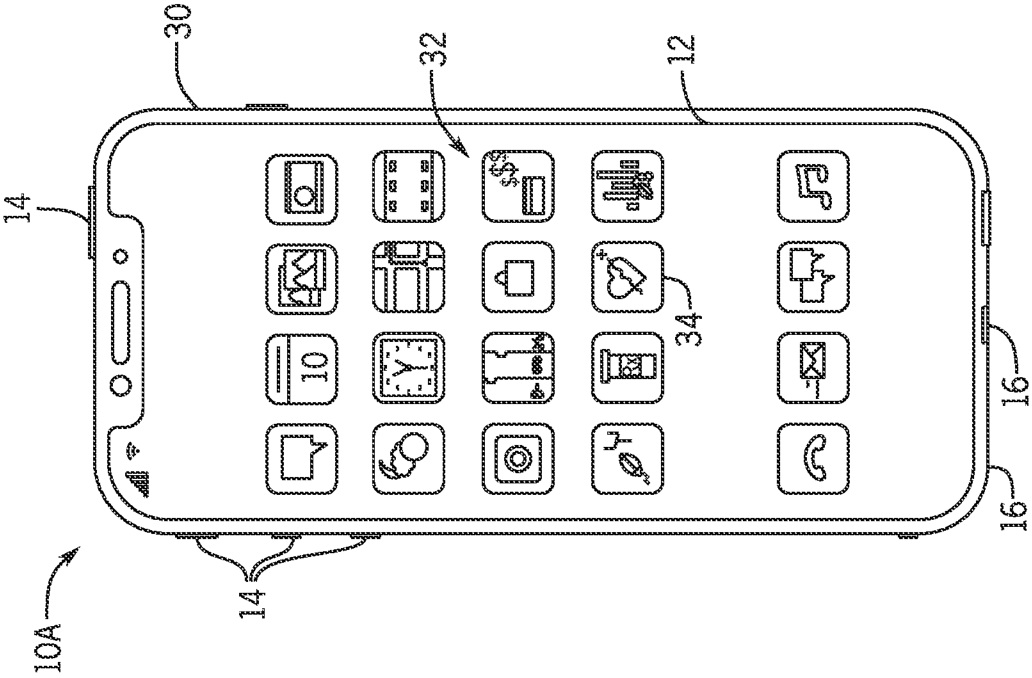
FIG. 2 is an example of the electronic device of FIG. 1, in accordance with an embodiment.

The electronic device 10 may be any suitable electronic device. To help illustrate, one example of a suitable electronic device 10, specifically a handheld device 10A, is shown in FIG. 2. The handheld device 10A may be a portable phone, a media player, a personal data organizer, a handheld game platform, and/or the like. For illustrative purposes, the handheld device 10A may be a smart phone, such as any IPHONE® model available from Apple Inc.

The handheld device 10A includes an enclosure 30 (e.g., housing). The enclosure 30 may protect interior components from physical damage and/or shield them from electromagnetic interference, such as by surrounding the electronic display 12. The electronic display 12 may display a graphical user interface (GUI) 32 having an array of icons. When an icon 34 is selected either by an input device 14 or a touch-sensing component of the electronic display 12, an application program may launch.

The input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, toggle between vibrate and ring modes, or the like. The I/O ports 16 may be accessed through openings in the enclosure 30 and may include an audio jack to connect to external devices.

Figure 3:
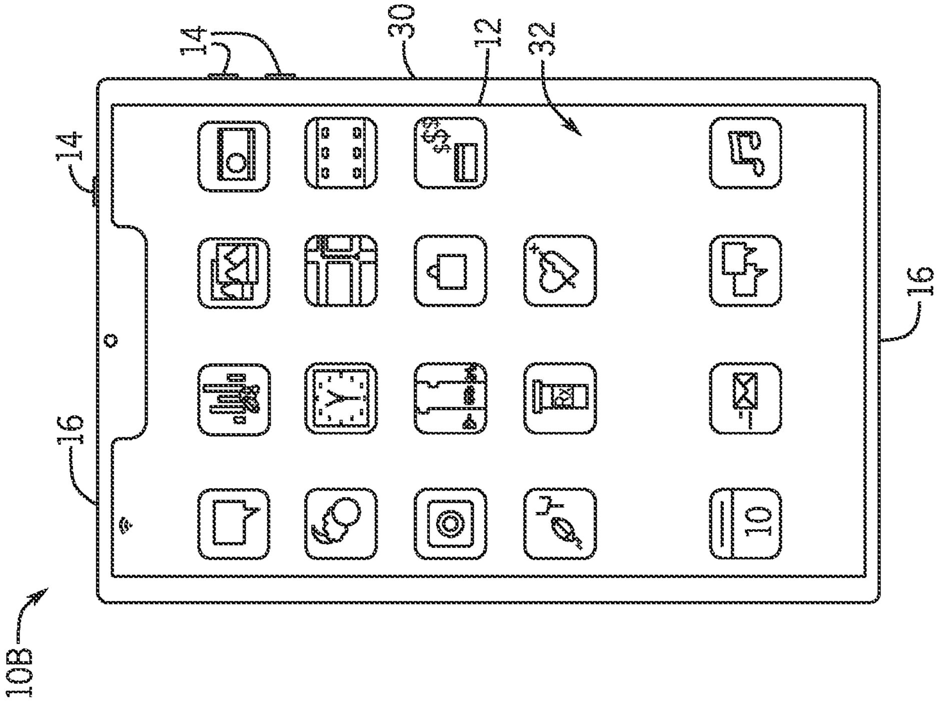
FIG. 3 is another example of the electronic device of FIG. 1, in accordance with an embodiment.
Figure 4:
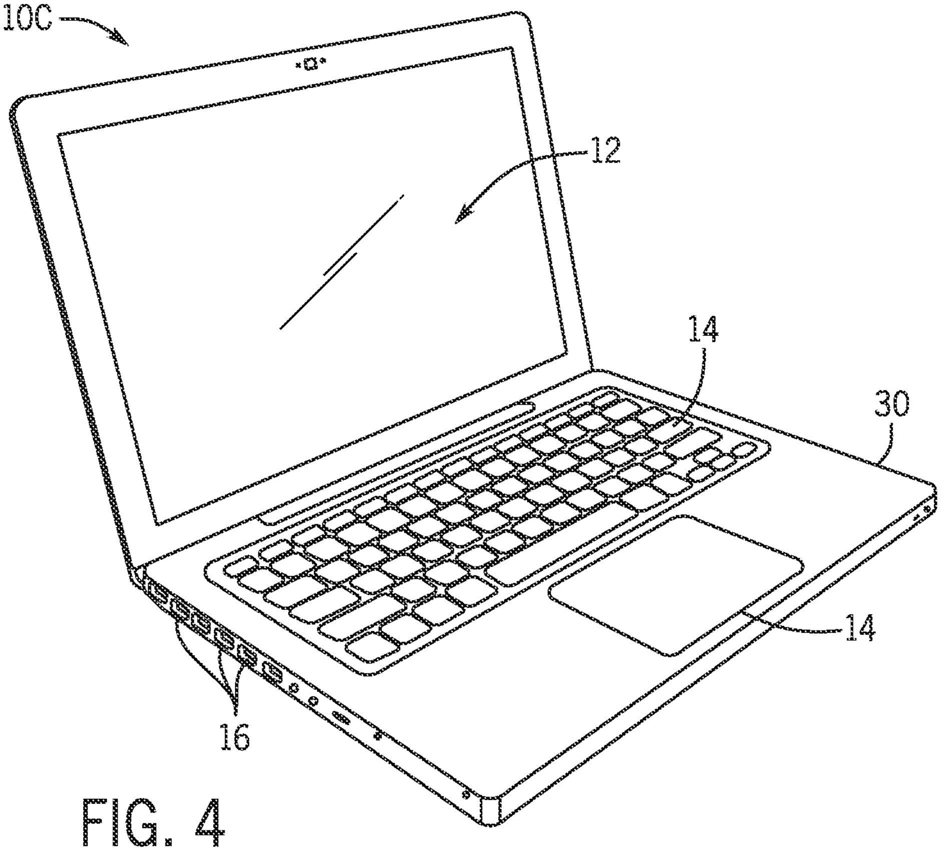
FIG. 4 is another example of the electronic device of FIG. 1, in accordance with an embodiment.
Figure 5:
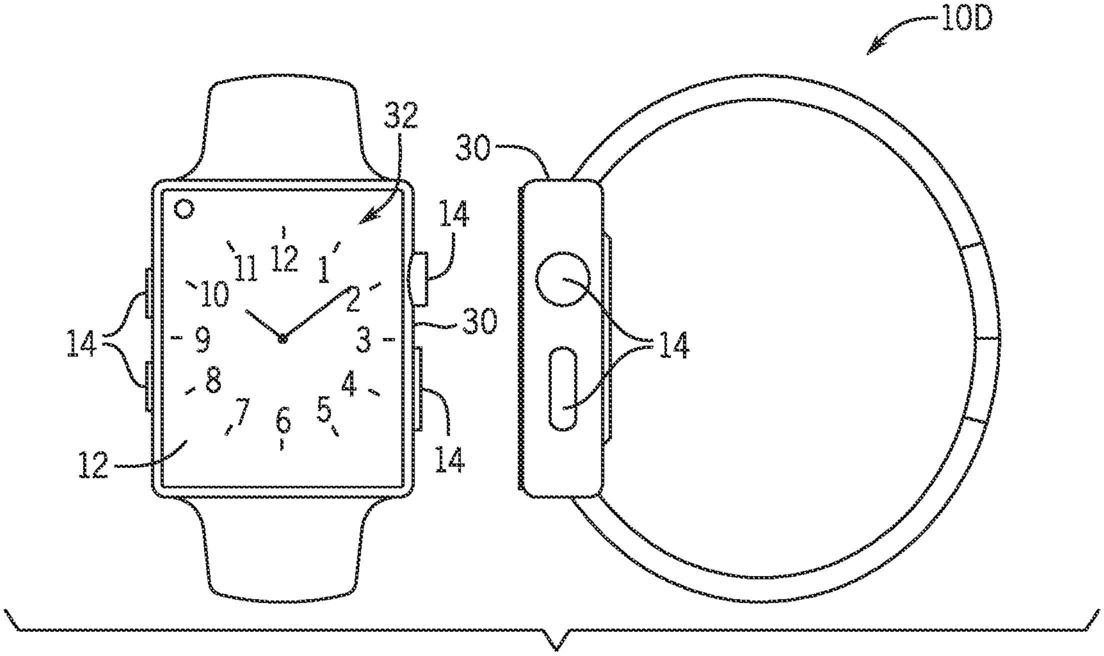
FIG. 5 is another example of the electronic device of FIG. 1, in accordance with an embodiment.

Another example of a suitable electronic device 10, specifically a tablet device 10B, is shown in FIG. 3. For illustrative purposes, the tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple, Inc. Another example of a suitable electronic device 10, specifically a watch 10D, is shown in FIG. 5. For illustrative purposes, the watch 10D may be any APPLE WATCH® model available from Apple, Inc. The tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Operating an electronic device 10 to communicate information by displaying images on its electronic display 12 generally consumes electrical power. The electronic device 10 often stores a finite amount of electrical energy. Thus, to reduce power consumption, an electronic device 10 may operate the electronic display 12 to continuously present image frames while other circuitry of the electronic device 10 are temporarily power-gated and/or powered-off.

Figure 6:
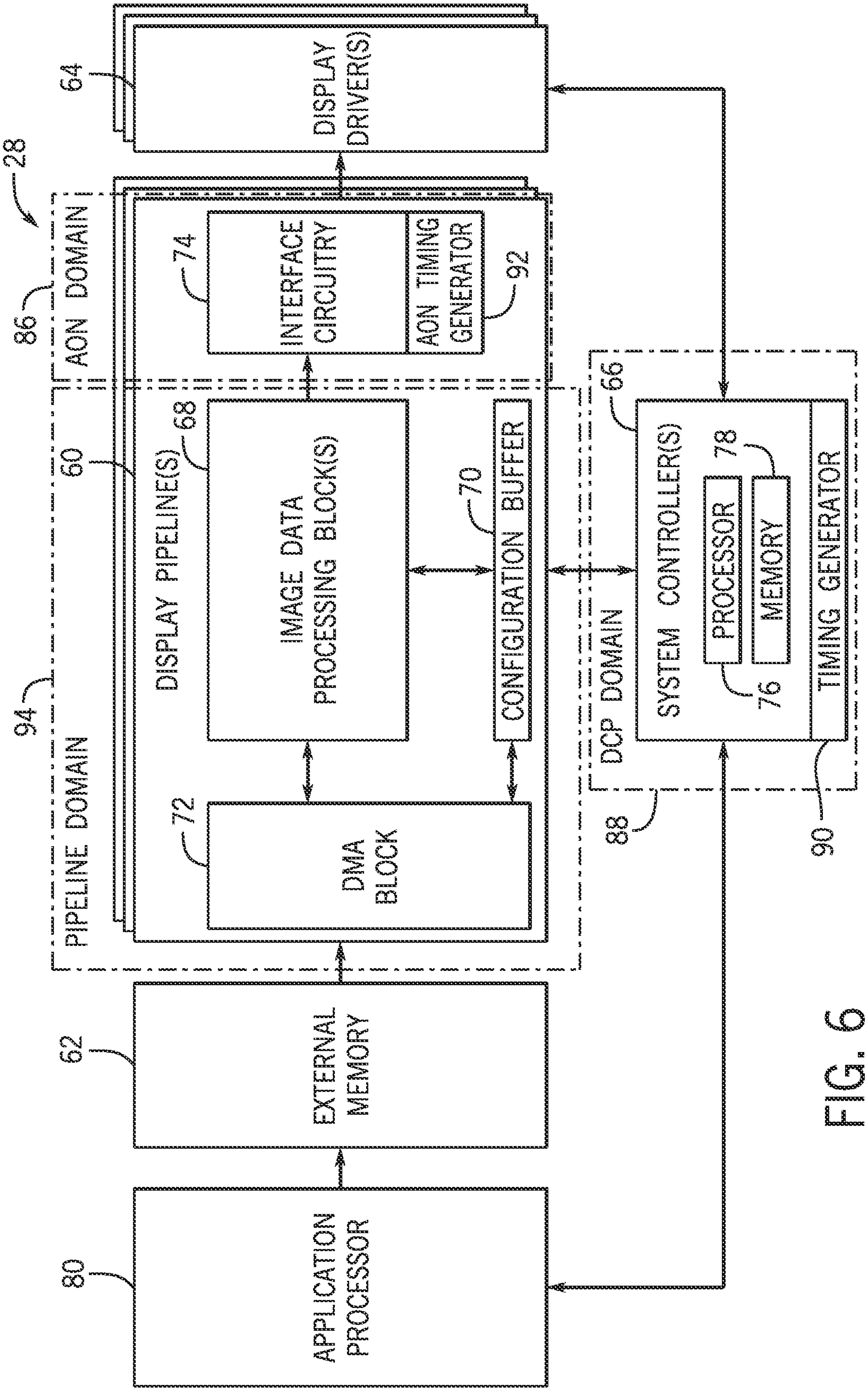
FIG. 6 is a block diagram of a portion of the electronic device of FIG. 1 including an application processor and a display pipeline, in accordance with an embodiment.

To help illustrate, an image processing circuitry 28 that includes one or more display pipelines 60, which may be implemented in the electronic device 10, is shown in FIG. 6. The image processing circuitry 28 also includes an application processor 80, external memory 62 (e.g., local memory 20), and one or more system controllers 66. Each system controller 66 may be a display pipeline 60 controller located within the display pipeline 60. The image processing circuitry 28 may communicatively couple to one or more display driver integrated circuits 64 (DDIC), which may be implemented in an electronic display 12. The system controller 66 may control operations of the display pipeline 38, the external memory 40, the DDIC 64, and/or other portions of the electronic device 10. One or more display pipelines 60 may correspond to one or more DDICs 64.

The system controller 66 may include a controller processor 76 and controller memory 78. The controller processor 76 may execute instructions stored in the controller memory 78 included in local memory 20, the main memory storage device 22, external memory 62, internal memory of a display pipeline 60, a separate tangible, non-transitory, computer readable medium, or any combination thereof. The controller processor 76 may be included in the processor core complex 18, the image processing circuitry 28, a separate processing module, or any combination thereof. Although depicted as a system controller 66, one or more separate system controllers 66 may be used to control operation of the electronic device 10.

The display pipeline 60 may operate to process image data to improve perceived image quality of a resulting image presented on the electronic display 12. The display pipeline 60 may receive image data from an image source, such as an application processor 80 or other suitable image source. Systems and methods described herein reference the application processor 80 as the image source. It should be understood that some or all of these systems and methods may be applied to other image generating circuitry to achieve similar power saving technical effects.

The application processor 80 may generate and write the image data to the external memory 62 for access by the display pipeline 60. The display pipeline 60 may be implemented via circuitry and packaged as a system-on-chip (SoC). The display pipeline 60 may be included in the processor core complex 18, the image processing circuitry 28, other processing circuitry of the electronic device 10, or any combination thereof.

The display pipeline 60 may include a direct memory access (DMA) block 72, a configuration buffer 70, interface circuitry 74, and one or more image processing circuitry 68. The display pipeline 60 may operate to read pre-rendered image data from the external memory 62 for processing using the DMA block 72. The application processor 80 may pre-render image data associated with a flip-book presentation mode. Image data may be saved in association with timestamps. While in the flip-book presentation mode, the display pipeline 60 may present image data at the time indicated by the timestamp and thus begin processing the image data a suitable amount of time prior to the timestamp. While in the flip-book presentation mode and idle before processing image data, the image processing circuitry 28 may be operated in the low-power mode until being woken up to process the image data. By entering and exiting the low-power mode over time, the electronic device 10 may consume lower amounts of power than a different electronic device 10 that uses a static power supply that does not change in response to idleness.

The display pipeline 60 may support arbitrary presentation times of image frames and/or variable display refresh rates. With arbitrary presentation times, the display pipeline 60 may transmit image data to the DDIC 64 at any time specified by a time stamp corresponding to the image data. When a time between sequential image frame start times is relatively long, the display pipeline 60 and/or portions of the electronic device 10 may be idle between the processing of subsequent image data. In some cases, the electronic device 10 may power off the idle subsystems. An always-on (AON) domain 86 may remain at a full supply power level while a device controller domain (DCP domain) 88 and/or a pipeline domain 94 are powered off or powered gated. Arbitrary presentation times and power gating may be used to reduce power consumed by the electronic device 10. The application processor 80 may generate time stamp queue entries that correspond to image data stored in the external memory 62. After writing the time stamp queue entries and/or the image data in the external memory 62, the display pipeline 60 may retrieve the stored image data and entries in preparation for output, such as at a later time and/or while the application processor 80 has had a supply power reduced. The time stamp queue entries may be referenced when operating the electronic device 10 in an always-on mode that enables autonomous presentation of image frames without the application processor 80 actively rendering each image frame for presentation.

To elaborate, the DDIC 64 may generate control signals in response to receiving image data from the interface circuitry 74. When the electronic display 12 does not include a frame buffer, or image data buffering memory, the display pipeline 60 may be the timing leader for the electronic display 12 presentation operations. The display pipeline 60 may transmit repeated image data to cause an electronic panel of the electronic display 12 to refresh. The display pipeline 60 may transmit different image data to cause the electronic display 12 to present an updated image frame or progressed image content.

A timing generator 90 of the display pipeline 60 may be associated with the system controller 66 and located outside of the AON domain 86. The timing generator 90 may generate full video timing and related signals, which sometimes may exclude some synchronization signals generated by an always-on (AON) timing generator 92. When the electronic device 10 is in the low-power mode, the timing generator 90 may be turned off or supplied the reduced amount of power. The always-on (AON) timing generator 92 may be included in the AON domain 86. The always-on (AON) timing generator 92 may generate the timing signals when the electronic device 10 is in the low-power mode and the timing signals may be generated without also generating new content to present on the electronic display 12 (e.g., image frame). The AON timing generator 92 may continue to send timing signals while the electronic device 10 is operated into the low-power mode so that when AOD mode is exited, the electronic display 12 and image processing circuitry 28 operations can be aligned to the timing signals without delay or disruption. Although shown as outside the display pipelines 60, the timing generator 90 may be disposed in any suitable location within the image processing circuitry 28, such as within one or more of the display pipelines 60. It is also noted that any suitable number of components may be used to implement these systems and methods, which may include greater or fewer numbers of components than what is described herein.

Figure 7:
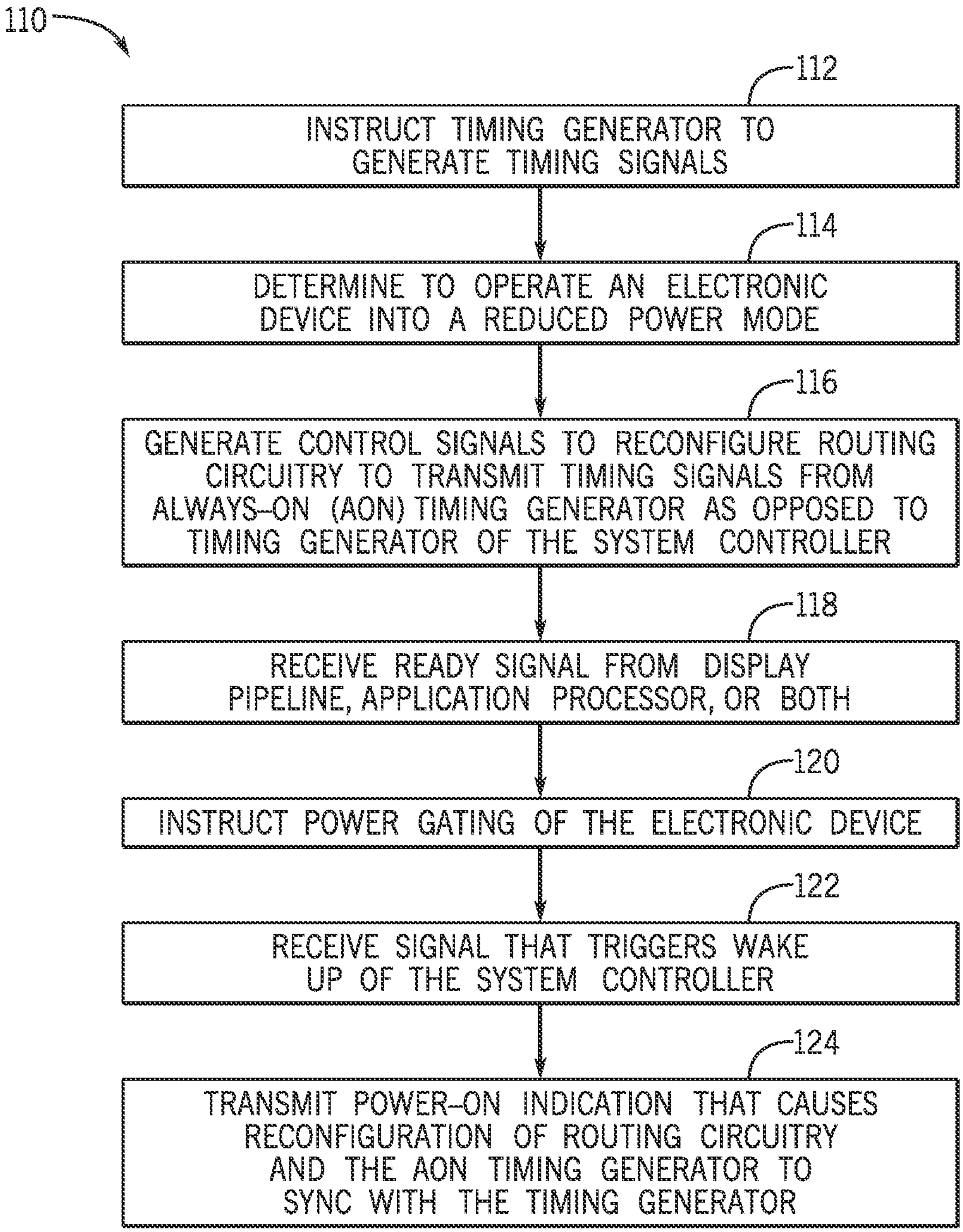
FIG. 7 is a flowchart of a process for operating an always-on timing generator that enables device power gating, in accordance with an embodiment.

To elaborate, FIG. 7 is a flowchart of a process 110 for using the AON timing generator 92 to enable device power gating. Although the process 110 is described as performed by the system controller 66, it should be understood that the operations may be performed by executing instructions stored in a tangible, non-transitory, computer-readable medium, such as external memory 62, using processing circuitry, such as the application processor 80, the system controller 66, or another processor of the processor core complex 18. Indeed, a processor executing instructions stored in a tangible, computer-readable medium, such as instructions corresponding to a design application or other software, may perform operations of the process 110. Although certain operations of the process 110 are presented in a particular order in FIG. 7, it should be understood that additional or fewer operations may be used in the same or different operational order than that presented below.

At block 112, the system controller 66 may instruct the timing generator 90 to generate timing signals. The timing signals may help align the generation and processing subsystems to preparatory operations of the DDIC 64. The timing generator 90 associated with the system controller 66 may generate these signals when the electronic device 10 is operated at a full supply power (e.g., normal supply power, full voltage, normal operational mode). After being instructed, the timing generator 90 may operate autonomously to generate timing signals based on counters that count rising edges of a video clock. Sometimes the system controller 66 may instruct the AON timing generator 92 to generate the timing signals in place of the timing generator 90. The timing generator 90 and the AON timing generator 92 are described further in FIG. 8.

Figure 8:
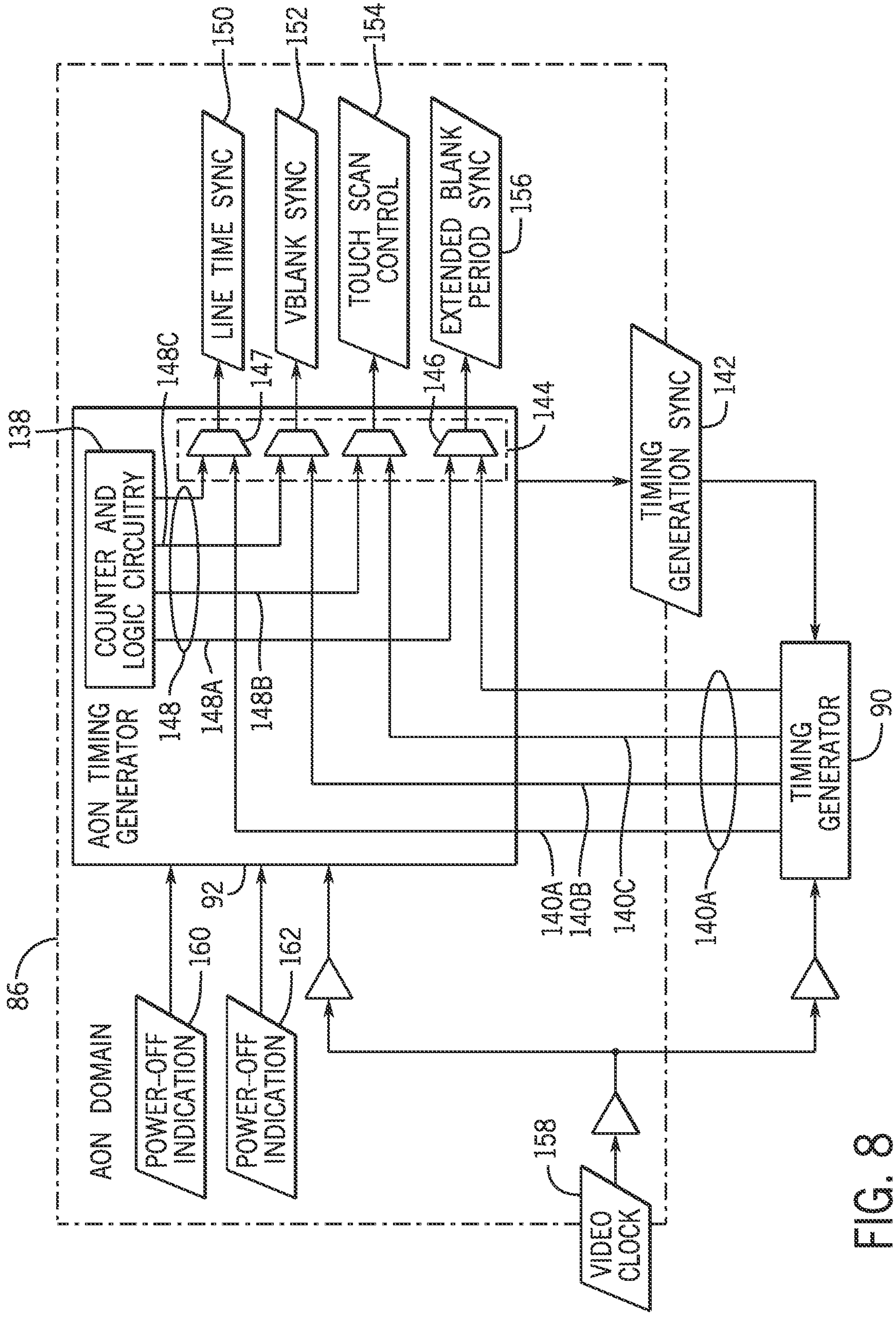
FIG. 8 is a block diagram of a timing generator and the always-on timing generator described in FIG. 7, in accordance with an embodiment.

FIG. 8 is a block diagram of the timing generator 90 and the AON timing generator 92, and illustrates connections not shown in FIG. 7. Counter and logic circuitry 138 may count edges (rising or falling edges) of a video clock signal 158 to track line times and sub-frame time intervals. Timing signals

140 generated by the timing generator 90 may be synchronized first to a timing generation synchronizing (sync) signal 142 before being generated. Synchronization to the timing generation sync signal 142 may occur in response to the AON timing generator receiving a power-on indication 160. The power-on indication 160 may communicate to the AON timing generator 92 that the high-power mode has started. Conversely, a power-off indication 162 may communicate to the AON timing generator 92 that the low-power mode has started. The AON timing generator 92 may reprogram the routing circuitry 144 in different ways based on which of power indications 160, 162 are received. While in the higher-power mode, the timing generator 90 may generate the timing signals 140. Once generated, the timing generator 90 may transmit the timing signals 140 to routing circuitry 144 of the AON timing generator 92. The routing circuitry 144 may include any number of multiplexers 146, switches, logical gates (e.g., AND gate, OR gate, not-AND gates, not-OR gates, exclusive-OR gates, inverters). Some or all of the routing circuitry 144 may be programmable.

The AON timing generator 92 may program the routing circuitry 144 into different modes to transmit either timing signals 148 generated by the counter and logic circuitry 138 or timing signals 140 generated by the timing generator 90. In some cases, the system controller 66 may transmit one or more control signals to program the routing circuitry 144 directly or to trigger the AON timing generator 92 to program the routing circuitry 144. The control signals may be generated by the system controller 66 based on an indication of the power mode to use to operate the electronic device 10. When the electronic device 10 is operated using a non-power gated power mode, the system controller 66 may program the routing circuitry 144 to transmit the timing signals 148 generated by counter and logic circuitry 138. However, when the electronic device 10 is to be power-gated, the DCP domain 88 may be powered off. When the DCP domain 88 is off, the timing generator 90 subsequently may also power off when supply voltages of the timing generator 90 correspond to the supply voltages of the DCP domain 88. While the timing generator 90 is powered-off, the AON timing generator 92 is the timing leader. The routing circuitry 144 may transmit the timing signals 148 to the DDICs 64 while the timing generator 90 is powered off.

The AON timing generator 92 may transmit a timing generation sync signal 142, a line time sync signal 150, a vertical blanking sync signal 152, a touch scan control signal 154, and an extended blank period sync signal 156 based on a video clock signal 158. These signals may be generated using the counter and logic circuitry 138, the timing generator 90, or a combination of the two, and may be routed back through the routing circuitry 144 of the AON timing generator 92 for transmission to the DDIC 64.

An upstream always-on (AON) phase locked loop (PLL) may recover the video clock signal 158 based on a crystal (e.g., 32 kilohertz (kHz) crystal). The AON timing generator 92 may transmit the timing generation sync signal 142 to the timing generator 90 at exit from the low-power mode once power is returned to the timing generator 90. The timing generator 90 may align its generation operations to the timing generation sync signal 142. The AON timing generator 92 may transmit the line time sync signal 150, the Vblank sync signal 152, the touch scan control signal 154, and the extended blank period sync signal 156 to the DDIC 64 of the electronic display 12. The DDIC 64 may receive the timing signals and may generate control signals based on the timing signals. The control signals may include pixel driving signals, clocking signals, touch electrode signals, sense electrode signals, or the like that may cause image presentation and/or touch sensing operations to occur in response to the output signals from the AON timing generator 92.

To elaborate, control circuitry (e.g., DDIC 64, a timing controller) of the electronic display 12 may reference the line time sync signal 150 when setting image frame presentation durations and/or aligning to an emissivity loop that sets the image frame presentation duration. The control circuitry of electronic display 12 may trigger touch scan operations (e.g., touch sensing operations) in response to receiving the touch scan control signal 154. Moreover, the control circuitry of electronic display 12 may manage an arbitrary presentation time display mode based on the extended blank period sync signal 156, which may indicate when a presentation time duration of any length begins and ends. For example, the extended blank period sync signal 156 may have a logical high voltage value in response to the presentation time duration beginning and a logical high voltage value in response to the presentation time duration ending. Between the beginning and end of the presentation time duration, the extended blank period sync signal 156 may hold the logical high voltage value.

It is noted that the AON timing generator 92 is to serve as the timing leader while the electronic display 12 is on, something the timing generator 90 may be incapable of when powered off or power gated. Serving as a timing leader does not require the AON timing generator 92 track all video timing signals, but may have the AON timing generator 92 tracking lines of image data and/or sub-frame groups of lines of image data, as well as the timing of the lines and/or sub-frames. The AON timing generator 92 may track a sub-frame line count and a line clock count using the counter and logic circuitry 138. The sub-frame line count and the line clock count may be used to set the times at which the different output signals are asserted and de-asserted. A first clock of each line may correspond to a count of zero, as may the first line of each sub-frame. Offsets determined may be relative to these counts, meaning an offset of one may correspond to a count of one.

Configuration registers of the AON timing generator 92 may be programmed before the AON timing generator 92 is enabled. Once enabled, the AON timing generator 92 may not have its registers reconfigured until it is disabled again. The AON timing generator 92 may be disabled when idle. The configuration registers may store data dictating whether the AON timing generator 92 is enabled or disabled, data defining a number of video clocking signal 158 rising or falling edges in each video line, and/or data defining a number of video lines in each sub-frame. Thus, by counting edges of the video clocking signal 158 and corresponding the counted edges to expected amount of counted edges corresponding to one line of an image frame, the AON timing generator 92 may track progress through lines of image data within an image frame, progress through the sub-frames of the image frame, and/or progress through image frames.

The AON timing generator 92 may transmit the timing generation sync signal 142 to the timing generator 90 at exit from the low-power mode. The counter and logic circuitry 138 may, for example, assert the timing generation sync signal 142 at a sub-frame cadence within an emissivity loop, or durations of time allocated to different image presentation and/or touch sensing operations continuously repeated over time as a loop. The timing generator 90 may initiate timing signal generation after being powered on and enabled in response to the timing generation sync signal 142, which aligns signals generated by the timing generator 90 to the same or substantially similar emissivity loop being used by the electronic display 12 at the time of the timing generator 90 being turned back on. Once timing generation of the timing generator 90 has begun, the timing generation sync signal 142 may be ignored by the timing generator 90.

To save power, the timing generation sync signal 142 may be a pulse as opposed to a continuously transmitted toggling signal. The timing generation sync signal 142 may be toggled at a value of the line clock counter and/or at a value of the sub-frame line counter, which may be tracked via the counter and logic circuitry 138, which may align resulting operations performed based on the assertion of the timing generation sync signal 142 to the system clock. These values may be stored in a register of the AON timing generator 92. The counter and logic circuitry 138 may generate the timing generation sync signal 142 based on the configuration registers, which may define whether the signal is active high or active low, a duration to hold the signal active, or the like.

The counter and logic circuitry 138 may assert the line time sync signal 150 at a start of each line of image data. Other cadences may be used in different systems, such as asserting the line time sync signal 150 every two lines, every three lines, or the like. The AON timing generator 92 may generate the line time sync signal 150 while the timing generator 90 is powered on and generating the timing signals 140. Programmable properties of the line time sync signal 150 may include whether the assertion of the line time sync signal 150 is active high or active low, a number of clock cycles for which the line time sync signal 150 remains asserted, and at which line clock count the line time sync signal 150 is asserted. The system controller 66 may program the AON timing generator 92 registers based on system configurations of the image processing circuitry 28. The counter and logic circuitry 138 may generate the line time sync signal 150 based on the configuration registers.

The counter and logic circuitry 138 may assert the Vblank sync signal 152 during vertical blanking periods, such as during standard vertical blanking and extended vertical blanking. When transitioning between power operational modes, the Vblank sync signal 152 may remain asserted before the timing generator 90 generates the timing signals 140 to aid transition between the AON timing generator 92 and the timing generator 90 driving the generation of the Vblank sync signal 152. The AON timing generator 92 may output the Vblank sync signal 152 uninterrupted during the change between operational power modes. When powered on, as part of the power operational mode transition, the timing generator 90 may transmit an initialization signal to clear a bit that triggers timing generation by the timing generator 90. The bit may change which output the multiplexers 146 select. A particular state of the bit (e.g., set, clear) may trigger the transmission of the Vblank sync signal 140A as the Vblank sync signal 152. In some cases, the timing generator 90 may generate the line time sync signal 150. In these cases, an additional multiplexer 147 may be disposed between an output from the AON timing generator 92 and the counter and logic circuitry 138 to toggle between transmitting the line time sync signal 150 generated by AON timing generator 92 and the line time sync signal 150 generated by the timing generator 90.

The counter and logic circuitry 138 may assert the touch scan control signal 154 on a sub-frame cadence, such as at the beginning of each sub-frame duration. The touch scan control signal 154 may trigger touch scan operations of the electronic display 12. A duration of a pulse transmitted as the touch scan control signal 154 may be configurable. A rising edge of the pulse may occur at a line count and a falling edge of the pulse may occur at a subsequent line count. Configuration registers of the AON timing generator 92 may define whether the touch scan control signal 154 is asserted active high or active low, a number of lines for which the pulse remains asserted, a value of the line clock counter at which the pulse is asserted, and a value of the subframe line counter at which the pulse is asserted. The counter and logic circuitry 138 may generate the touch scan control signal 154 based on the configuration registers.

The counter and logic circuitry 138 may assert the extended blank period sync 156 at a point in time before a first line of an extended blank period (otherwise defined for the electronic device 10 as part of per-product configurations) and may de-assert it at a first line of subsequent vertical active duration (e.g., a time period for presentation of image data). As part of a power operational mode transition, the timing generator 90 may transmit its extended blank period sync signal 156 and the system controller 66 may clear a bit in response to the extended blank period sync signal 156. Clearing the bit may cause the multiplexer 146 to transmit the extended blank period sync 156 as extended blank period sync 156 to the DDIC 64.

Referring back now to FIG. 7, at block 114, the system controller 66 may determine to operate the electronic device 10 into the low-power mode. The system controller 66 may determine this in response to some circuitry of the electronic device 10 being idle, such as the image processing circuitry 28 being idle between image data processing. To do so, the system controller 66 may generate control signals to reduce power to some of the domains 86, 88, 94. This may include generating control signals to prepare to shut down or power gate power supplied to certain of the domains 86, 88, 94.

While the electronic device 10 is power-gated, the electronic display 12 may receive timing signals from the AON timing generator 92. To prepare for this, at block 116, the system controller 66 may generate one or more control signals to reconfigure the routing circuitry 144 to transmit the timing signals 148 generated by the AON timing generator 92 as opposed to the timing signals 140 generated by the timing generator 90. For example, the system controller 66 may generate a control signal that operates multiplexing circuitry to transmit timing signals 148 generated by the AON timing generator 92 and to block signals received via electrical couplings to the timing generator 90.

At block 118, the system controller 66 may receive a ready signal from the display pipeline 60 and/or application processor 80. The ready signal may indicate that preparations to enter the low-power mode are complete. These preparations may include generating image data for future presentation and/or generating corresponding display pipeline 60 configurations to be applied at power-on when the display pipeline 60 is woken up to be configured.

At block 120, responsive to the ready signal, the system controller 66 instructs power gating of the display pipeline 60. The system controller 66 may wait to power gate the image processing circuitry 68 until the image processing circuitry 68 is idle. To power gate the image processing circuitry 68, the system controller 66 may instruct power management circuitry to decouple one or more power rails from the image processing circuitry 68. The power source 26 may use one or more power rails to deliver supply voltages to various portions of the electronic device 10. The system controller 66 may generate the power-off indication 162 indicating to the AON timing generator 92 when the power rails are decoupled. Responsive to the power-off indication 162, the AON timing generator 92 may generate a first of the timing signals 148 and transmit at least one control signal to the routing circuitry 144 cause output of the first timing signal and to block output of a second signal from the timing generator 90 to the DDIC 64.

After a duration of time, the system controller 66, at block 122, may be woken up. Wake-up may occur at a set time period or set frequency, in response to a wake-up interrupt signal, or the like. At wake up, the system controller 66 may configure the system controller 66 by writing configuration parameters to registers of the timing generator 90, which program timing signal generation for the electronic display 12. The system controller 66 may transmit a control signal to power management circuitry to increase a power supplied to the pipeline domain 94, such as by recoupling a power rail to supply the pipeline domain 94. The configuration parameters may indicate a value of the line clock counter at which to toggle the timing generation sync signal 142 and/or at a value of the sub-frame line counter at which to toggle the timing generation sync signal 142. The configuration parameters may indicate whether the assertion of the line time sync signal 150 is active high or active low, a number of clock cycles for which the line time sync signal 150 remains asserted, and at which line clock count the line time sync signal 150 is asserted. The configuration parameters may indicate a number of lines and when to assert the touch scan control signal 154. The configuration parameters may set up operations for the timing generator 90 to use when generating the timing signals.

At block 124, the system controller 66 may generate the power-on indication 160 that may cause reconfiguration of the routing circuitry 144 and/or the AON timing generator 92 to sync with the timing generator 90. The power-on indication 160 may indicate the wake up to the AON timing generator 92. In response to the power-on indication 160, the AON timing generator 92 may program the routing circuitry 144 to pass through the timing signals generated by the timing generator 90 to the DDIC 64. The signals passed through the routing circuitry 144 may include the Vblank sync signal 152, the touch scan control signal 154, and the extended blank period sync signal 156. The power-on indication 160 may also cause the AON timing generator 92 to transmit the timing generation sync signal 142 to the timing generator 90. At receipt of the timing generation sync signal 142, the timing generator 90 may generate the timing signals 140.

Figure 9:
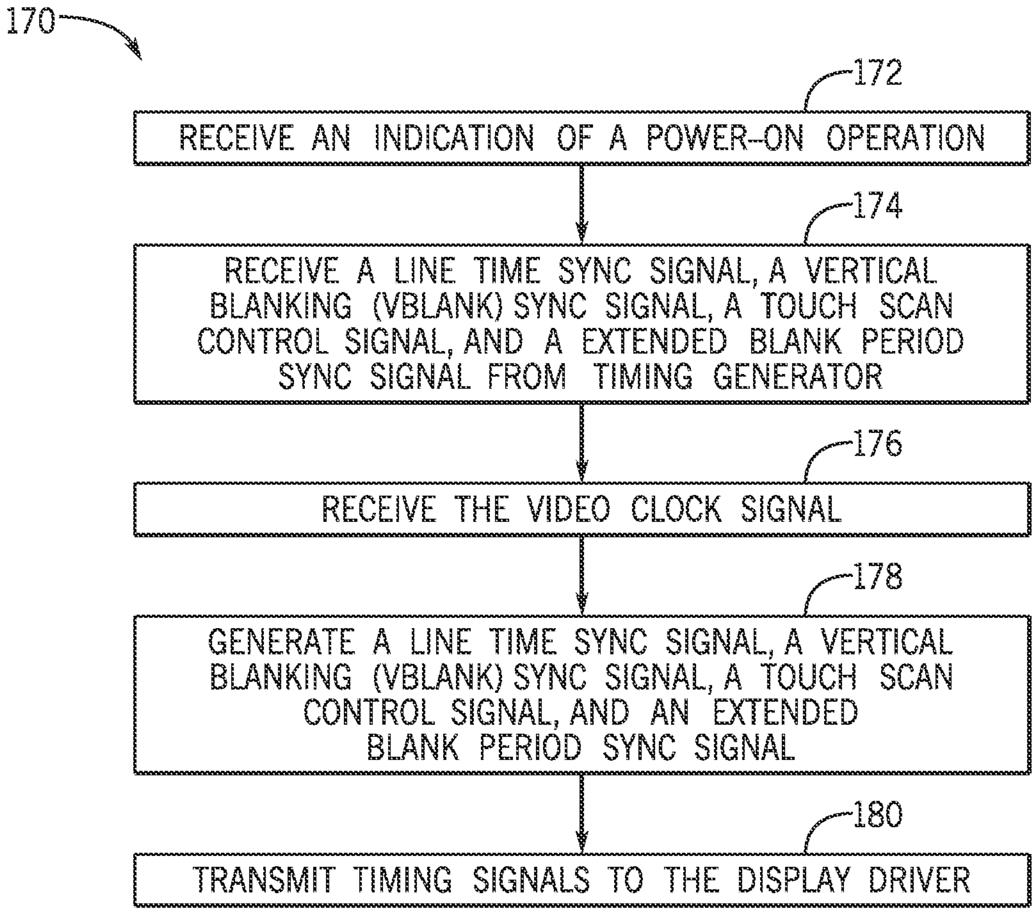
FIG. 9 is a flowchart of a process for generating and transmitting timing signals via the AON timing generator, in accordance with an embodiment.

To elaborate on AON timing generator 92 operations, FIG. 9 is a flowchart of a process 170 for generating and transmitting timing signals via the AON timing generator 92. Although the process 170 is described as performed by the AON timing generator 92, it should be understood that the operations may be performed by executing instructions stored in a tangible, non-transitory, computer-readable medium, such as external memory 62, using processing circuitry, such as the application processor 80 or the system controller 66. Indeed, a processor executing instructions stored in a tangible, computer-readable medium, such as instructions corresponding to a design application or other software, may perform operations of the process 170. Although certain operations of the process 170 are presented in a particular order in FIG. 9, it should be understood that additional or fewer operations may be used in a same or different operational order than that presented below.

At block 172, the AON timing generator 92 may receive a power-on indication 160 while the electronic device 10 is in the low-power mode. The power-on indication 160 may cause the AON timing generator 92 to initiate synchronization with the timing generator 90. To do so, the AON timing generator 92 transmits the timing generation sync signal 142 to the timing generator 90.

After the timing generator 90 has matched its timing to the timing generation sync signal 142, at block 174, the AON timing generator 92 may receive the vertical blanking (Vblank) sync signal 140A, the touch scan control signal 140B, and the extended blank period sync signal 140C from the timing generator 90. The timing generator 90 may generate the timing signals 140 based on the video clock signal 158.

At block 176, the AON timing generator 92 may receive the video clock signal 158. At block 178, the AON timing generator 92 may generate a line time sync signal 150, the vertical blanking (Vblank) sync signal 148C, the touch scan control signal 148B, and the extended blank period sync signal 148A based on the video clock signal 158. The AON timing generator 92 and the timing generator 90 may generate the timing signals 140 and 148 using the same methods to ensure timing is synchronous. The timing characteristics of a line time sync signal 150, the Vblank sync signal 148C, the touch scan control signal 148B, and the extended blank period sync signal 148A based on the video clock signal 158 are described above with respect to descriptions of FIG. 8, and more particularly the descriptions of line time sync signal 150, Vblank sync signal 152, touch scan control signal 154, and extended blank period sync signal 156.

At block 180, the AON timing generator 92 may transmit the line time sync signal 150, either the Vblank sync signal 140A or Vblank sync signal 148C as the Vblank sync signal 152, either the touch scan control signal 140B or the touch scan control signal 148B as the touch scan control signal 154, and either the extended blank period sync signal 140C or the extended blank period sync signal 148A as the extended blank period sync signal 156 to the DDIC 64. The subset may include signals based on which power operational mode the electronic device 10 is operated in. In some cases, the system controller 66 may program the AON timing generator 92 to transmit some of the timing signals 140 generated by the timing generator 90 and some of the timing signals 148 generated by the AON timing generator 92.

Figure 10:
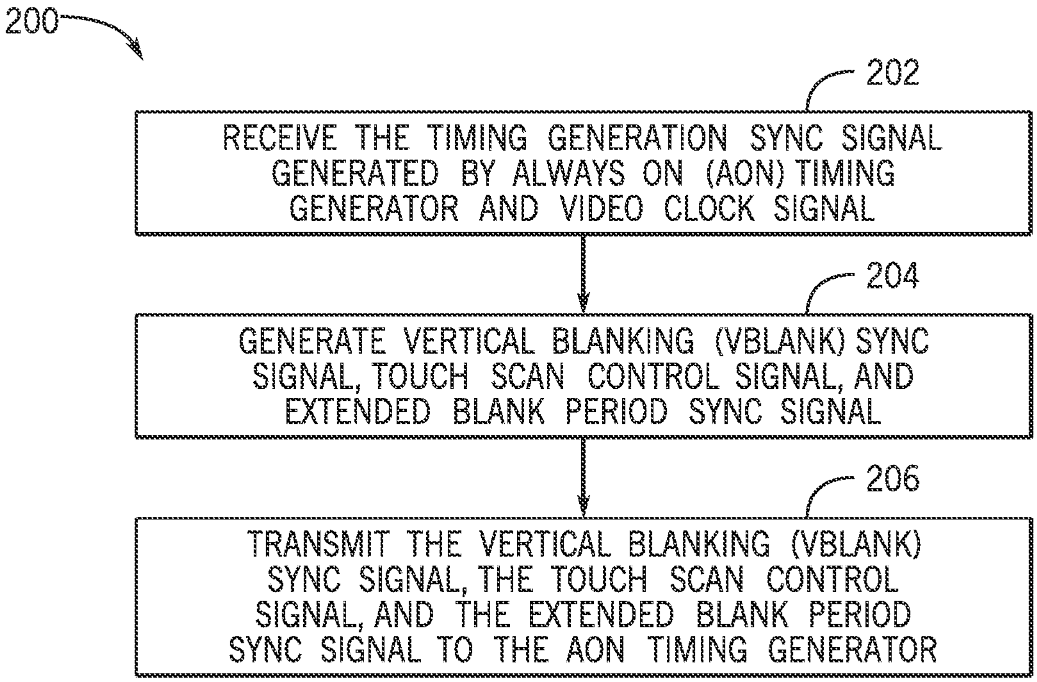
FIG. 10 is a flowchart of a process for generating and transmitting timing signals via the timing generator of FIG. 8, in accordance with an embodiment.

To elaborate on the timing generator 90 operations, FIG. 10 is a flowchart of a process 200 for generating and transmitting timing signals 140 via the timing generator 90. Although the process 200 is described as performed by the timing generator 90, it should be understood that the operations may be performed by executing instructions stored in a tangible, non-transitory, computer-readable medium, such as external memory 62, using processing circuitry. Indeed, a processor executing instructions stored in a tangible, computer-readable medium, such as instructions corresponding to a design application or other software, may perform operations of the process 200. Although certain operations of the process 200 are presented in a particular order in FIG. 10, it should be understood that additional or fewer operations may be used in a same or different operational order than that presented below.

At block 202, the timing generator 90 may receive the timing generation sync signal 142 generated by the AON timing generator 92 and the video clock signal 158. The timing generator 90 may configure its circuitry to match or be based on timing of the timing generation sync signal 142. Aligning the operations may involve programming frequency intervals, configurating voltage settings, or the like. In some cases, configuring the circuitry of the timing generator involves generating the timing signals 140 in response to receiving the timing generation sync signal 142, which may align the start of generation operations to a time at which the timing generation sync signal 142 is received.

At block 204, the timing generator 90 may generate the Vblank sync signal 140A, the touch scan control signal 140B, and the extended blank period sync signal 140C based on the timing generation sync signal 142 and the video clock signal 158. The timing generator 90 may reference similar configuration registers and settings as those referenced by the AON timing generator 92, such as registers and settings described with reference to FIG. 8. At block 206, the timing generator 90 may transmit the Vblank sync signal 140A, the touch scan control signal 140B, and the extended blank period sync signal 140C to the AON timing generator 92.

Figure 11:
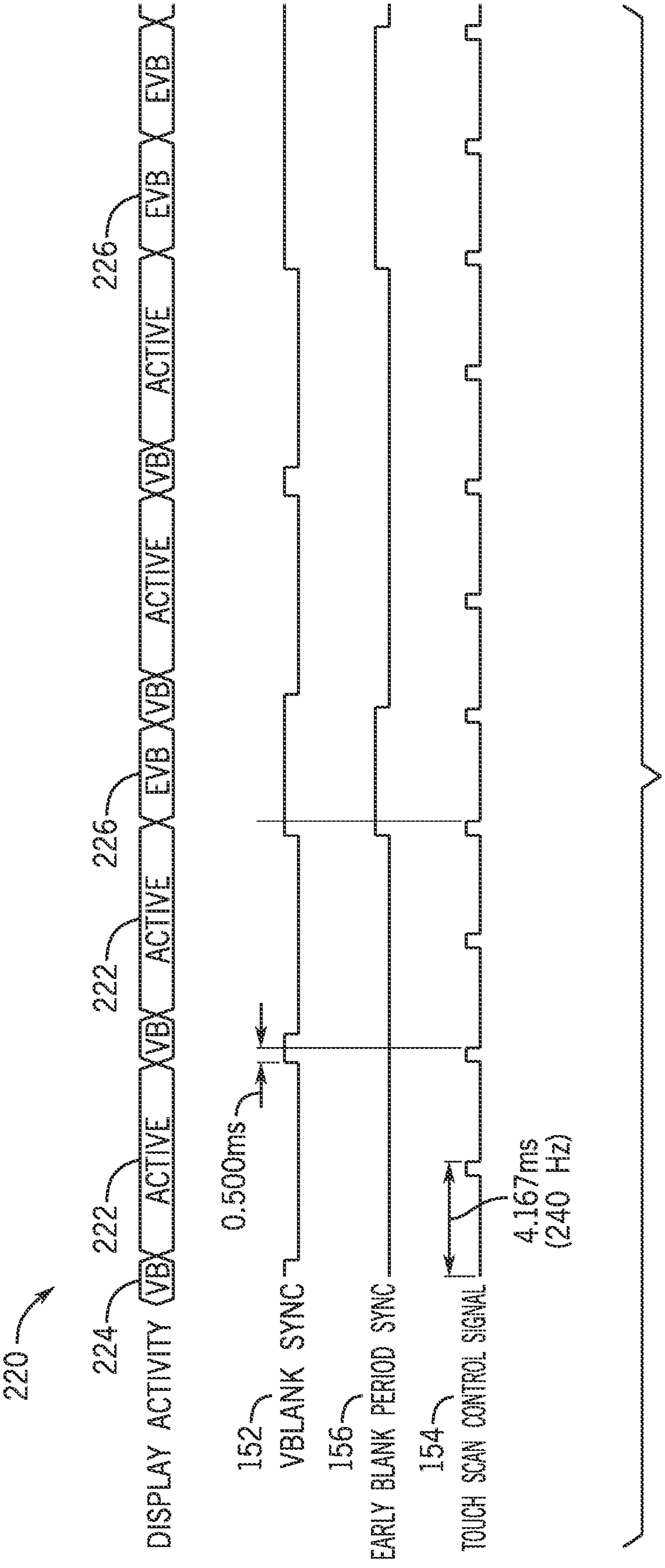
FIG. 11 is a timing diagram of a subset of the timing signals of FIG. 8, in accordance with an embodiment.

FIG. 11 is a timing diagram of some of the timing signals 220 that may be transmitted to the DDIC 64 by the AON timing generator 92. The timing signals 220 may be generated by the AON timing generator 92 and/or the timing generator 90. The timing signals 220 may be graphically associated with image frame presentation durations 222. Vertical blank 224 duration may correspond to a time allocated for vertical blank operations. The extended blank period sync signal 156 corresponds to extended vertical blanks 226 representing time allocated for extended vertical blank operations. A first rising edge may start a respective extended vertical blank 226 and a second rising edge may end the respective extended vertical blank 226. The extended blank period sync signal 156 may be received a duration in advance of the extended vertical blanks 226.

The Vblank sync signal 152 may be asserted a duration before and remain asserted until the end of vertical blank 224. The touch scan control signal 154 may have a frequency, such as 240 Hertz (Hz), and may have falling edges aligned, or substantially aligned, to rising edges of the vertical blank 224 and/or the extended vertical blank 226. The electronic display 12 may use the vertical blank 224 and/or the extended vertical blank 226 to load image data for presentation on the electronic display 12. Loading of the image data may include new image data to cause display of adjusted image content or repeated image data to refresh the display. The change in the touch scan control signal 154 (e.g., the rising edge or the falling edge) may cause the touch sensing operations to begin.

Thus, the technical effects of the present disclosure include systems and methods for maintaining synchronicity in timing between image processing and image presentation operations while changing between power operational modes of an electronic device. Reducing overall power consumption of an electronic device may improve electronic device operation by, for example, extending battery life and potentially improving reliability. However, doing so may temporarily power off a timing generator disposed in a power domain associated with image processing circuitry since the timing generator may be powered by voltage signals being reduced or turned off for the power consumption operations. Once off, the timing generator may lose a synchronous lock with the electronic display, which can lead to misalignment in presented image frames, visual glitches, or other similar perceivable visual artifacts. By including an additional always-on (AON) timing generator in a different power domain than those gated to reduce power consumption, the AON timing generator may be used to resync operations between the electronic display and the image processing circuitry when woken up to process and present image data. The AON timing generator may provide a synchronization signal (e.g., timing generation sync signal of FIG. 8) to the timing generator repeatedly so that the synchronization signal is available to the timing generator when the image processing circuitry switches from the reduced-power mode to the higher-power mode. The synchronization signal may switch the second timing generator into the higher-power mode when the image processing circuitry switches from the reduced-power mode to the higher-power mode. Device operation may improve from using an AON timing generator since a likelihood of image presentation operations and image processing operations being unaligned may reduce, and thus so does a likelihood of perceivable visual artifacts occurring in presented image data.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Furthermore, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device, comprising:

an electronic display configured to display image data based at least in part on a timing signal from a timing generator while image processing circuitry is operating in a higher-power mode than a reduced-power mode; and an always-on timing generator configured to generate and transmit the timing signal to the electronic display while the image processing circuitry is operating in the reduced-power mode, wherein the reduced-power mode corresponds to a first power supply being decoupled from a first power domain.

2. The electronic device of claim 1, wherein the reduced-power mode corresponds to when the image processing circuitry is not generating new image data.

3. The electronic device of claim 2, wherein, while the image processing circuitry is operating in the higher-power mode, the timing generator routes the timing signal through the always-on timing generator to the electronic display.

4. The electronic device of claim 2, wherein the always-on timing generator is configured to provide a synchronization signal to the timing generator repeatedly so that the synchronization signal is available to the timing generator when the image processing circuitry switches from the reduced-power mode to the higher-power mode.

5. The electronic device of claim 2, wherein the always-on timing generator is configured to provide a synchronization signal to the timing generator to switch the timing generator into the higher-power mode in response to the image processing circuitry switching from the reduced-power mode to the higher-power mode.

6. The electronic device of claim 1, wherein the timing signal comprises a line time sync signal, a vertical blanking sync signal, a touch scan control signal, or an extended blank period sync signal, or any combination thereof, wherein the timing signal is based on a video clock signal generated from a crystal and a phase locked loop (PLL) configured to operate while the image processing circuitry is operating in the reduced-power mode and while the image processing circuitry is operating in the higher-power mode than the reduced-power mode.

7. The electronic device of claim 1, wherein the always-on timing generator is disposed in a different power domain than the image processing circuitry.

8. A system, comprising:

a first power supply for a first power domain and a second power supply for a second power domain;

a controller configured to:

determine that image processing circuitry is operated in a reduced-power mode after being idle; and generate one or more control signals in response to determining that the image processing circuitry is operated in the reduced-power mode; and an always-on timing generator disposed in the second power domain, wherein the always-on timing generator is configured to:

determine that the image processing circuitry is operating in the reduced-power mode based on an indication that the first power supply is decoupled from the first power domain;

generate timing signals while the first power supply is decoupled from the first power domain; and adjust routing circuitry based on the one or more control signals to transmit the timing signals generated by the always-on timing generator to a display driver integrated circuit disposed in an electronic display.

9. The system of claim 8, wherein the controller is configured to couple to the first power supply and to the second power supply, and wherein the controller is configured to transmit a first control signal to decouple the first power supply from the first power domain to reduce power supplied to an additional timing generator disposed in the first power domain.

10. The system of claim 9, wherein the always-on timing generator is configured to generate the timing signals based on a video clock signal while the image processing circuitry is idle, and wherein the additional timing generator is configured to generate the timing signals based on the video clock signal while the image processing circuitry is not idle.

11. The system of claim 9, wherein the additional timing generator is configured to transmit the timing signals to the display driver integrated circuit via the always-on timing generator.

12. The system of claim 9, wherein the controller is configured to:

determine to wake up the image processing circuitry; and transmit a second control signal to couple the first power supply to the first power domain to increase power supplied to the first power domain.

13. The system of claim 12, wherein the controller is configured to, at wake up of the image processing circuitry, transmit a third control signal to the always-on timing generator, and wherein the always-on timing generator is configured to, in response to the third control signal, transmit a timing generation synchronization (sync) signal to the additional timing generator.

14. The system of claim 13, wherein the additional timing generator is configured to transmit the timing signals in response to the timing generation sync signal, and wherein the timing signals generated by the additional timing generator are configured to be aligned to a rising edge of the timing generation sync signal.

15. A tangible, non-transitory, computer-readable medium, comprising instructions that, when executed by a processor, cause an always-on timing generator to perform operations comprising:

determining that a first power supply associated with an electronic display is decoupled from a first power domain;

generating a first timing signal based on a clock signal while the first power supply is decoupled from the first power domain and image processing circuitry is operated in a reduced-power mode, wherein an additional timing generator is configured to generate a second timing signal based on the clock signal while the first power supply is coupled to the first power domain; and transmitting a control signal to routing circuitry, wherein the control signal is configured to trigger output of the first timing signal to a display driver integrated circuit.

16. The computer-readable medium of claim 15, wherein the always-on timing generator is powered by a second power domain disposed outside the first power domain.

17. The computer-readable medium of claim 15, in response to receiving a power-off indication, generating the first timing signal, wherein the first timing signal is configured to align a start time of an image processing operation of the image processing circuitry with a start time of an image driving operation of the display driver integrated circuit, wherein determining that the first power supply is decoupled from the first power domain is based on receiving the power-off indication, and wherein the first power supply being decoupled from the first power domain is configured to power-off the additional timing generator.

18. The computer-readable medium of claim 17, wherein the operations comprise receiving the power-off indication in response to a display pipeline being ready for a flip-book presentation mode, and wherein the display pipeline being operated in the flip-book presentation mode is configured to trigger decoupling of the first power supply from the first power domain.

19. The computer-readable medium of claim 15, wherein the operations comprise:

tracking a time interval based on the clock signal; and generating the first timing signal based on the time interval.

20. The computer-readable medium of claim 15, wherein the operations comprise:

receiving the second timing signal from the additional timing generator; and after determining that the first power supply is coupled to the first power domain, transmitting the second timing signal via the routing circuitry.

* * * * *